United States Patent [19]
Grosseau

[11] 3,805,635
[45] Apr. 23, 1974

[54] REMOTE CONTROL LINKAGE FOR AUTOMOTIVE TRANSMISSION
[75] Inventor: Albert Grosseau, Paris, France
[73] Assignee: Societe Anonyme Automobiles Citroen, Paris, France
[22] Filed: June 21, 1973
[21] Appl. No.: 372,017

[30] Foreign Application Priority Data
July 20, 1972 France .............................. 72.26225

[52] U.S. Cl. ............................ 74/473 R, 74/473 P
[51] Int. Cl. ............................................. G05g 9/16
[58] Field of Search ......... 74/473 P, 473 SW, 473 R

[56] References Cited
UNITED STATES PATENTS
2,280,157  4/1942  Mead .......................... 74/473 SW X
2,547,317  4/1951  Gustafson ........................ 74/473 R

*Primary Examiner*—Benjamin W. Wyche
*Assistant Examiner*—F. D. Shoemaker
*Attorney, Agent, or Firm*—Wenderoth, Lind & Ponack

[57] ABSTRACT

Remote control linkage for a gearbox of a motor vehicle includes a pair of driven levers, one for selecting the gear ratios and the other for actually producing the shifting to the selected gear ratio. The levers are operatively connected to a gear shift lever operable by the driver through linkage including a pair of links pivotally connected to the driven levers and a main control rod extending across the links. One link connects one of the driven levers to one arm of a control member consisting of a two-armed bell-crank lever fulcrumed at the junction of its two arms to a pivot pin rigid with the body of the vehicle. The main control rod is pivotally connected at three points, that is, to the other link connected to the other driven lever, to the end of the other arm of the two-armed control member, and to the gear shift lever. The pivotal connections between the main control rod and the other link and the other arm of the bell-crank lever consist of universal ball-and-socket joints. The center of the pivotal connection between the main control rod and the gear shift lever is located at the end of the gear shift lever on an axis extending across the main rod.

3 Claims, 5 Drawing Figures

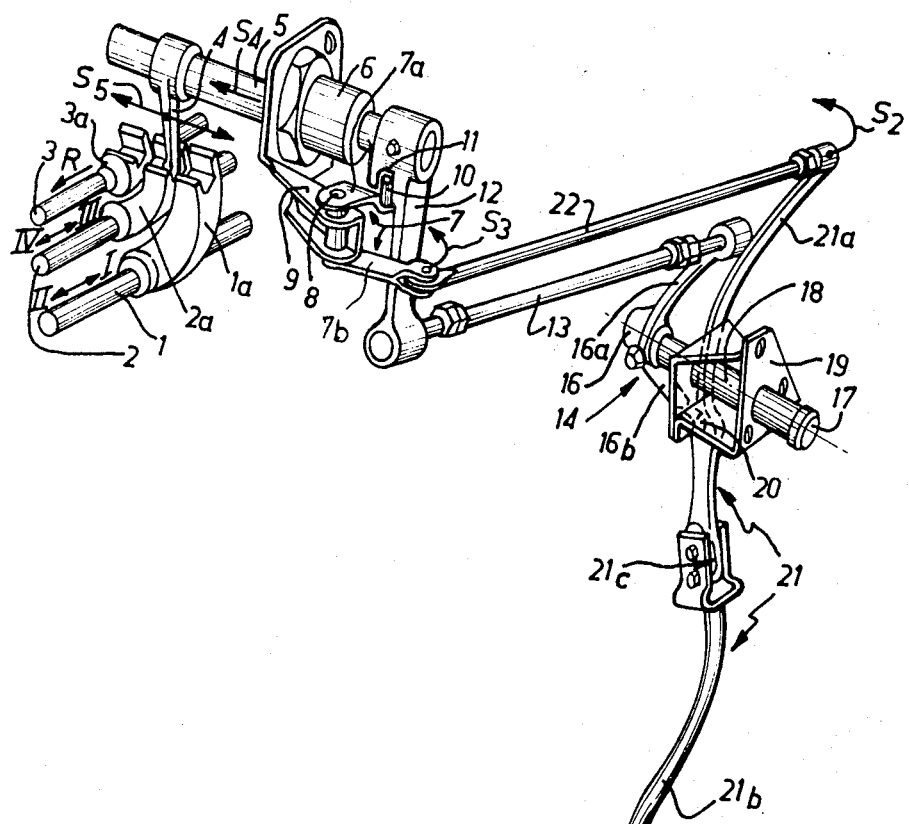
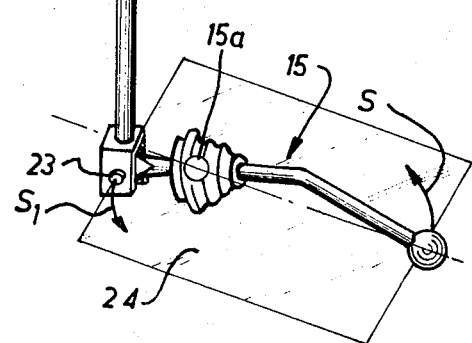
FIG. 1

REMOTE CONTROL LINKAGE FOR AUTOMOTIVE TRANSMISSION

This invention relates to a mechanical linkage assembly for remote controlling the gearbox of the power unit of a motor vehicle, applicable to gearboxes of the type comprising a pair of driven levers, one being the selector lever and the other the gear-ratio shift lever, as currently used in conventional gearboxes of the selector-rod type.

In many vehicles the gearbox associated with the power units is frequently relatively remote from the passenger compartment and therefore said driven levers must be remote controlled by means of a gear shift lever disposed within easy reach of the driver and connected through suitable linkage means to said driven levers.

It is the essential object of the present invention to provide a particular construction of such remote control linkage advantageously excluding the use of sliding mountings and capable of absorbing the movements of the gearbox in relation to the body of the vehicle, without producing any detrimental reaction on the control lever.

Basically, according to this invention the remote control linkage for the gearbox of a motor vehicle, said gearbox comprising a pair of driven levers, one for selecting the gear ratios and the other for actually producing the shifting to the selected gear ratio, said levers being operatively connected to a gear shift lever operable by the driver through linkage means comprising a pair of links pivotally connected to said driven levers and a main control rod extending across said links, one link connecting one of said driven levers to one arm of a control member consisting of a two-armed bell-crank lever fulcrumed at the junction of its two arms to a pivot pin rigid with the body of the vehicle, said main control rod being pivotally connected at three points, that is to the other link connecting same to the other driven lever, to the end of the other arm of said two-armed control member and to said gear shift lever, is characterised in that the pivotal connections between said main control rod and said other link and said other arm of said bell-crank lever consist of universal ball-and-socket joints, the center of the pivotal connection between said main control rod and said gear shift lever being located at the end of this gear shift lever on an axis extending across said main control rod.

This remote control linkage is particularly advantageous and convenient in a structure comprising a gearbox associated with a power unit disposed transversely to the longitudinal center line of the vehicle, said rod extending substantially longitudinally to the vehicle and said links across same.

A typical form of embodiment of a control device according to this invention will now be described by way of example with reference to the attached drawings, in which :

FIG. 1 is a perspective view of the control linkage, illustrating a typical gear selection manoeuver ;

FIG. 5 is a diagrammatic, part-sectional view of a modified form of embodiment of this bell-crank lever.

Figure 2:
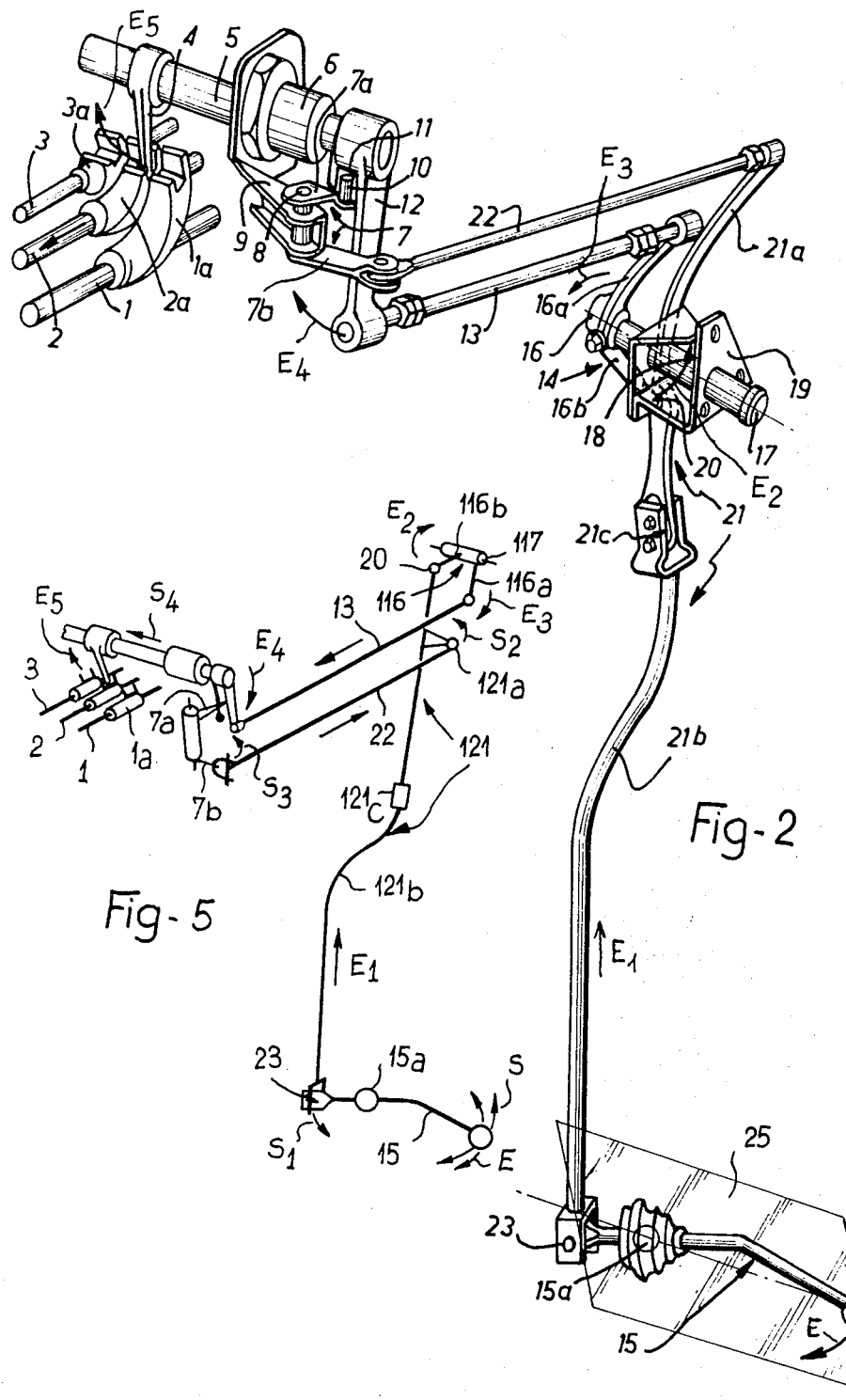
FIG. 2 is a view similar to FIG. 1 but illustrating a typical change-speed manoeuver.
Figure 3:
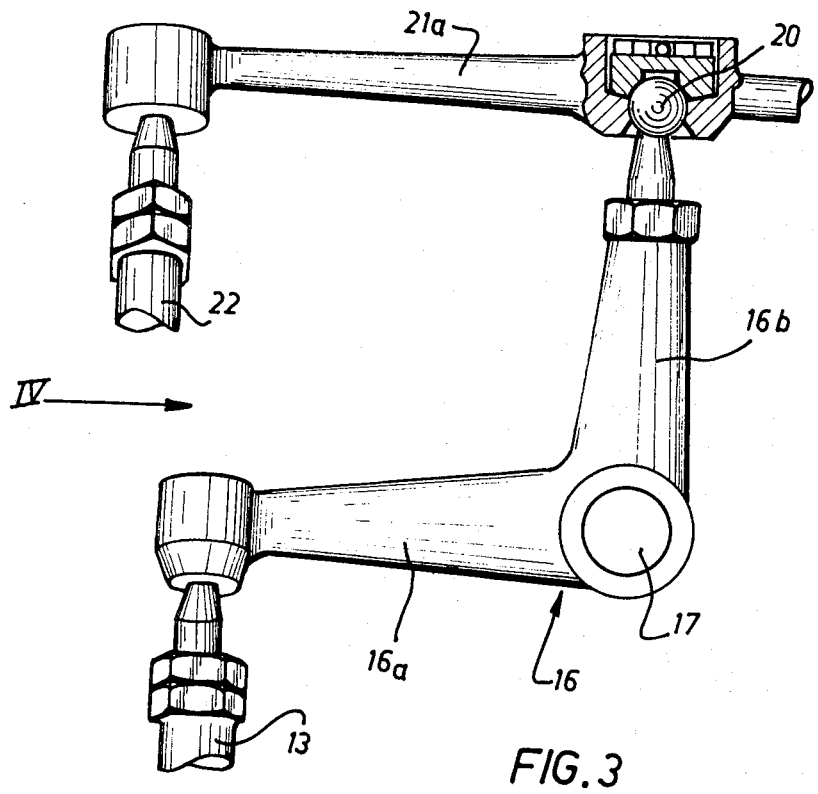
FIG. 3 is a plane view from above of the bell-crank lever.
Figure 4:
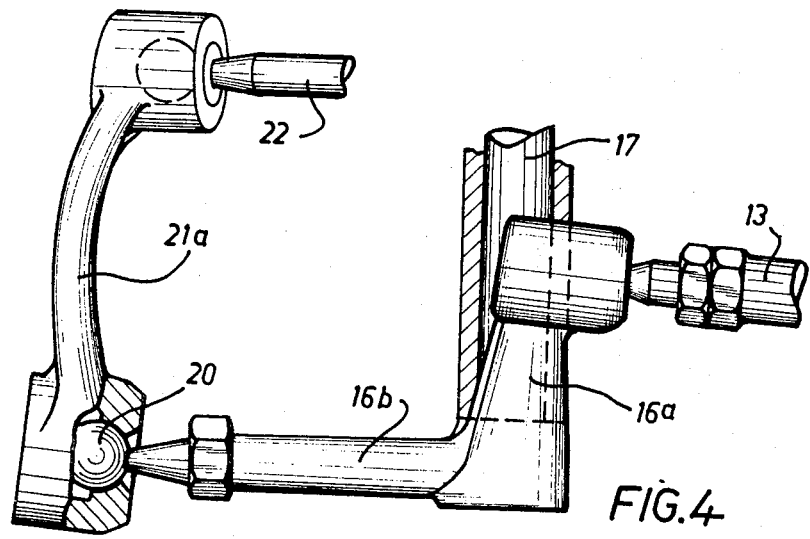
FIG. 4 is a part-sectional, part-elevational view taken in the direction of the arrow IV of the bell-crank lever of FIG. 3.

The remote linkage illustrated is intended primarily for actuating a conventional multiple-sliding gear gearbox wherein the sliding-gears are actuated by means of forks. Three slides 1, 2, 3 are rigidly connected to these forks having their heads 1a, 2a, and 3a respectively formed with grooves engageable by a driving finger 4 rigid in turn with a gearbox control rod 5. This control rod 5 is adapted to move in rotation and translation in bearings rigid with the gear case (not shown), one of these bearings being shown diagrammatically at 6.

As illustrated in FIG. 1, the axial movement of rod 5 is adapted to select the slide head corresponding to the selected gear ratio, the gearbox of this example providing four forward speeds designated by the arrows I, II, III and IV, and a reverse designated by the arrow R. The axial movement of this shaft 5 is obtained by means of a selector member 7 consisting of a two-armed bell-crank lever fulcrumed to a pivot pin 8 carried by a bracket 9 rigid with said bearing 6, one arm 7a of said bell-crank lever carrying at its free end a stud 10 engaging a groove 11 formed in the hub of a lever 12 rigidly connected to said rod 5. The function of this lever 12 consists in rotating the rod 5 and therefore producing a similar angular movement of the control or driving finger 4, thus shifting the mechanism to the desired gear ratio.

This gear lever 12 is actuated through a link 13 connected to a driving reversing device designated in general by the reference numeral 14 and actuated from the gear shift control lever 15, as will be explained presently.

This reversing device 14 comprises essentially a two-armed bell-crank lever 16a, 16b fulcrumed intermediate its arms to a pivot pin 17 carried by a bearing 18 secured to the body of the vehicle, in this example by means of a detachable bracket 19 (FIGS. 1 and 2).

The outer end of arm 16a is connected to link 13 and the outer end of arm 16b is connected through a universal bull-and-socket joint 20 to an intermediate point of a main control rod designated in general by the reference numeral 21 and having its ends pivotally connected the one to a link 22 (connected in turn to the arm 7b of selector lever 7) and the other to the lower end of the gear shift lever 15. In this construction this main rod 21 is divided into two sections 21a, 21b assembled at 21c by means of a strap provided with twin cross-pins for rigidly interconnecting the two sections in the longitudinal direction.

The gear shift lever 15 is mounted in this example by means of a universal joint 15a, the main rod 21 and the lower end of this gear shift lever 15 being pivotally interconnected by means of a cross-pin 23 disposed transversely to both members.

The above-described control linkage operates as follows :

To select the desired speed ratio the gear shift lever 15 is movable in a plane 24 perpendicular to the main rod 21, this lever 15 being shown in its intermediate or neutral position in which the finger 4 engages the slide head 2a corresponding to gear ratios III and IV.

Moving the gear shift lever 15 in the direction of the arrow S for selecting the slide head 3a corresponding to ratio R (reverse) is attended by an angular pivoting movement of rod 21 about the ball-and-socket joint 20 then acting as an intermedaite bearing point, the rod ends being thus caused to travel in the directions of the arrows $S_1$ and $S_2$, respectively, about a general axis intersecting the center of ball-and-socket joints 20 and 15a, with a corresponding angular modification in the rod orientation on account of its pivotal connection, through cross-pin 23, with gear shift lever 15.

The movement in the direction of the other arrow $S_2$ causes the link 22 to move the lever 7 angularly in the direction of the arrow $S_3$, thus moving the control rod 5 in the axial direction shown by the arrow $S_4$, whereby the control or driving finger 4 will travel in the direction shown by the arrow $S_5$.

To engage a selected gear ratio, the control lever 15 can be moved in a plane 25 perpendicular to the aforesaid plane 24, FIG. 2 illustrating the engagement of gear ratio IV from the intermediate or neutral position of said lever 15.

Moving the gear shift lever 15 in the direction of the arrow E is attended by a longitudinal movement of the main rod 21 in the direction of the arrow $E_1$, which causes in turn the angular movement of lever 16 about its pivot pin 17 in the direction of arrows $E_2$ and $E_3$, whereby the link 13 will transmit the motion to lever 12 (arrow $E_4$) and produce a similar angular movement of control or drive finger 4 in the direction of arrow $E_5$, thus causing the engagement of gear ratio IV. During the axial movement of main rod 21 the movement of the free end of its section 21a is absorbed by the angular movement of link 22 in relation to its pivot pin connecting this link to the arm 7b of selector bell-crank lever 7, without producing any interaction on this lever 7.

FIG. 5 illustrates a modified form of embodiment wherein the same reference numerals designates the same component elements, the essential change brought in this alternate construction residing in the fact that a rod 121 corresponding to the main rod 21 of the preceding construction, also divided into two sections 121a, 121b assembled at 121c, is connected to the link 22 at a point intermediate the ends of said main rod, the outer end of rod 121 being connected on the other hand to the arm 116b of a two-armed reversing lever 116 corresponding to the reversing lever 16 of the preceding form of embodiment, which is fulcrumed to a pivot pin 117, the other arm 116a of this two-armed lever 116 being connected to link 13.

In this case the control linkage is designed for a layout comprising a gearbox associated with a power unit disposed transversely to the axis of the vehicle, and since in this case the slides of forks 1, 2 and 3 are disposed transversely to the vehicle axis, the links 13, 22 are also disposed transversely whereas the main rod 21 or 121 extend substantially in the longitudinal direction of the vehicle, so that the links can easily absorb any movement of the power unit which are essentially of two types :

oscillation about an axis located close to the engine crankshaft, thus producing dynamic changes in the engine torque ;

the movements in the axial direction of the vehicle, due to accelerations or brake applications.

These links may be selected without difficulty with the proper length for absorbing these movements without producing any detrimental interference in the control lever.

The links, reversing lever and main rod assembly advantageously consists of a pivotal linkage without any sliding contact element.

The main rod may be shaped to accomodate an obstacle, if necessary.

This control linkage is applicable not only to gear shift lever of the floor type but also to any other gear shift lever arrangement, whether through the instrument panel or under the steering wheel, etc . . .

Generally, irrespective of the orientation of the power unit and of the gearbox with respect to the vehicle axis, this remote control linkage shall be arranged preferably with the links positioned as close as possible to the fork slides.

Although specific forms of embodiment of this invention have been described hereinabove and illustrated in the accompanying drawings, it will readily occur to those skilled in the art that various modifications and changes may be brought thereto without departing from the scope of the invention as set forth in the appended claims.

What is claimed as new is :

1. Remote control linkage for a gearbox of a motor vehicle, said gearbox comprising a pair of driven levers, one for selecting the gear ratios and the other for actually producing the shifting to the selected gear ratio, said levers being operatively connected to a gear shift lever operable by the driver through linkage means comprising a pair of links pivotally connected to said driven levers and a main control rod extending across said links, one link connecting one of said driven levers to one arm of a control member consisting of a two-armed bell-crank lever fulcrumed at the junction of its two arms to a pivot pin rigid with the body of the vehicle, said main control rod being pivotally connected at first point to the other link which is connected to the other driven lever, at a second point to the end of the other arm of said two-armed control member, and at a third point to said gear shift lever, the pivotal connections between said main control rod and said other link and said other arm of said bell-crank lever consist of universal ball-and-socket joints, the center of the pivotal connection between said main control rod and said gear shift lever being located at the end of said gear shift lever on an axis extending across said main rod.

2. Remote control linkage according to claim 1, for a gearbox associated with a power unit disposed transversely to the longitudinal center line of the vehicle, characterised in that said links extend across the vehicle and said main control rod extends longitudinally thereto.

3. Remote control linkage according to claim 1, characterised in that said main control rod is divided longitudinally into two sections rigidly interconnected.

* * * * *